Jan. 8, 1924.
H. M. PIERCE
1,480,415
MILK BOTTLE COVER
Filed Feb. 16, 1923
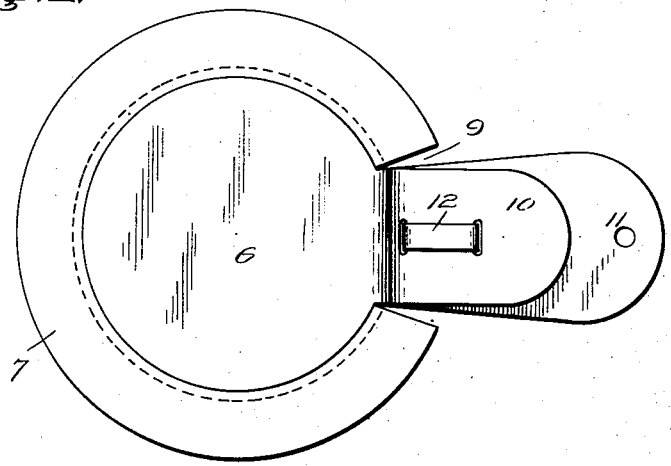
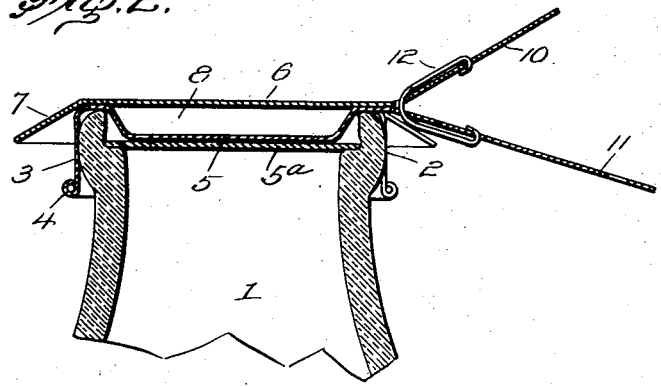
INVENTOR.
Henry M. Pierce.
BY
Geo. P. Kimmel. ATTORNEY.

Patented Jan. 8, 1924.

1,480,415

UNITED STATES PATENT OFFICE.

HENRY M. PIERCE, OF CHIPPEWA FALLS, WISCONSIN.

MILK-BOTTLE COVER.

Application filed February 16, 1923. Serial No. 619,440.

*To all whom it may concern:*

Be it known that I, HENRY M. PIERCE, a citizen of the United States, residing at Chippewa Falls, in the county of Chippewa and State of Wisconsin, have invented certain new and useful Improvements in Milk-Bottle Covers, of which the following is a specification.

This invention has reference to milk bottle covers and is designed as an attachment for milk bottles whereby the neck of the milk bottle is utilized to receive and contain, cash or tickets in payment for the milk, and the milk is protected from contamination.

The invention comprises a cover structure held in the closed position by a spring retained means, but which may be readily displaced from the covering position to permit access to the contents of the bottle so that the cash or tickets may be removed and the milk may be poured from the bottle without interference from the cover structure.

The invention comprises a lid or cover and a body portion or rim connected together by a spring tending to hold the cover in the closed position to protect the contents of the bottle from contamination and at the same time so constructed that money or tickets or both may be retained between the body portion and cover with a certainty that the parts will remain closed unless purposely disturbed.

The invention will be best understood from a consideration of the following detailed description taken in connection with the accompanying drawings forming part of this specification, with the understanding that the invention is not confined to any strict conformity with the showing of the drawings, but may be changed and modified so long as such changes and modifications mark no material departure from the salient features of the invention as expressed in the appended claims.

In the drawings:—

Figure 1 is a plan view of the attachment to the milk bottle embodying the invention.

Fig. 2 is a cross section in a vertical plane of the attachment.

Referring to the drawings, there is shown a milk bottle 1 of ordinary or normal construction and provided with a mouth 2, the structure being that usually employed in milk bottles.

The mouth 2 of the milk bottle is surrounded by a collar 3, snugly, though not too tightly, fitting the mouth of the bottle, and furnished at the lower end with a metal bead 4, which may be crimped or corrugated about the exterior of the mouth of the bottle to hold the collar in place but still not prevent to any great extent the removal of the collar from the mouth of the bottle when desired.

The collar 3 is provided with an inset or depressed mouth 5 entering the neck of the bottle to a limited extent to prevent the entrance of contaminating materials into the milk through said mouth, and also leaving room for the usual bottle cap 5ª.

Applied to and overlapping the collar 3 is a cover and handle member 6 having a beveled margin 7 depressed with relation to the main part 6 of the cover member so as to overlap the rim 3 of the body member and between the cover member 6 and the body members 3 and 5, for providing a receptacle 8 of appropriate depth to contain money or tickets or both in payment for the milk.

The beveled margin 7 is formed on one side of the cover member 6 with a cut away part 9 for the passage of a handle section 10 projecting from the cover member 6, while another handle member 11 is in opposed relation to the handle member 10 so that the handle members 10 and 11 are arranged at an angle one to the other in spaced relation, whereby the cover member 6 may be tilted with reference to the depressed member 5 by grasping the handle members 10 and 11 between the fingers of the hand and tilting the cover member 6 against the action of a leaf spring 12 opposing such displacement of the cover member 6.

The leaf spring 12 tends to hold the cover member 6 in closed relation to the cover member 5 producing the chamber 8 for the reception of money or tickets therebetween and at the same time maintaining the closed position of the cover member 6, but permitting the ready access of the customer or dealer to the chamber 8 for reaching the money or tickets therein contained.

The handle members 10 and 11 are sufficiently narrow and close together to permit the grasping of the same by the fingers of the hand of the person desiring access to the bottle and the handle 10 may be readily rocked on the handle 11 while contacting therewith to permit the opening of the cover member 6 to gain access to the chamber 8.

The collar 3 with its reinforcing bead 4 hugs the neck of the bottle with sufficient force to hold the cover in place and yet because of the break 9 in the continuity of the flange 7, there is sufficient elasticity to permit the application and removal of the cover from the bottle, with such force as may be readily applied by the hand of the operator without there being any danger of too loose a fit or too tight a fit, and consequently preventing any access of deleterious matter to the interior of the bottle.

The milkman may readily obtain access to the money or tickets contained in the chamber 8 to remove the same money or tickets or both and to place change therein and the same operation is permissible on the part of the customer.

The handles 10 and 11 provide means whereby money or tickets placed in the receptacle or chamber 8 may be readily reached by the milkman while the entire cap may be removed by the customer for giving access to the interior of the bottle by the customer, to reach the contents for pouring them from the bottle.

What is claimed is:—

1. A milk bottle cover comprising, a top having a depending split collar adapted to frictionally engage the milk bottle about its mouth and further having a central portion inset to depend into the bottle mouth to provide a coin tray, a handle member extending outwardly and downwardly from said top between the ends of said split collar, a cover for said coin tray having a split flange extending outwardly and downwardly around said collar, a handle member extending upwardly and outwardly from said cover between the ends of said split flange, and in opposed relation to said first mentioned handle, and a spring member extending through both handle members and having each end in engagement with a handle member.

2. A milk bottle closure comprising a sleeve-like collar surrounding the mouth of the bottle, a cover member for the collar provided with a downwardly inclined outstanding flange overhanging the sleeve, adjacent handle members on the cover and collar, and a spring connecting the adjacent handle members and having a normal tendency to hold the cover member and collar in closed position.

3. A milk bottle closure comprising a sleeve-like collar surrounding the mouth of the bottle, a cover member for the collar provided with a downwardly inclined outstanding flange overhanging the sleeve, adjacent handle members on the cover and collar, and a leaf spring connecting the adjacent handle members and having a normal tendency to hold the cover member and collar in closed position.

In testimony whereof, I affix my signature hereto.

HENRY M. PIERCE.